(12) United States Patent
Tiemann et al.

(10) Patent No.: US 6,231,303 B1
(45) Date of Patent: May 15, 2001

(54) GAS TURBINE HAVING A TURBINE STAGE WITH COOLING-AIR DISTRIBUTION

(75) Inventors: Peter Tiemann, Witten; Mirko Milazar, Oberhausen, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/494,768

(22) Filed: Jan. 31, 2000

Related U.S. Application Data

(63) Continuation of application No. PCT/DE98/02030, filed on Jul. 20, 1998.

(30) Foreign Application Priority Data

Jul. 31, 1997 (DE) .............................................. 197 33 148

(51) Int. Cl.[7] .............................. F01D 5/14; F03B 11/00
(52) U.S. Cl. .......................................... 415/115; 415/117
(58) Field of Search .................................... 415/115, 116, 415/117, 175, 208.1

(56) References Cited

U.S. PATENT DOCUMENTS

| | | |
|---|---|---|
| 3,377,803 | 4/1968 | Prachar . |
| 3,453,825 * | 7/1969 | May et al. ........................ 415/178 X |
| 3,635,586 * | 1/1972 | Kent et al. ........................ 415/115 X |
| 3,742,706 * | 7/1973 | Klompas .......................... 415/115 X |
| 4,497,610 * | 2/1985 | Richardson et al. ................. 415/116 |
| 4,512,715 * | 4/1985 | Cohn et al. ....................... 415/117 X |
| 4,526,226 * | 7/1985 | Hsia et al. ........................ 415/116 X |
| 4,752,185 * | 6/1988 | Butler et al. ........................... 415/175 |
| 5,048,288 * | 9/1991 | Bessette et al. .................. 415/116 X |
| 5,149,247 * | 9/1992 | Gros et al. ........................ 415/116 X |
| 5,993,150 * | 11/1999 | Liotta et al. .......................... 415/115 |

FOREIGN PATENT DOCUMENTS

| | | |
|---|---|---|
| 2 261 443 | 7/1973 | (DE) . |
| 26 33 291 | 1/1978 | (DE) . |
| 926 160 | 5/1963 | (GB) . |

OTHER PUBLICATIONS

"The 3A Gas Turbine Family from Siemens", Siemens Power Generation, pp. 1–5.

* cited by examiner

Primary Examiner—John E. Ryznic
(74) Attorney, Agent, or Firm—Herbert L. Lerner; Laurence A. Greenberg; Werner H. Stemer

(57) ABSTRACT

A gas turbine includes a first turbine stage having a first guide blade, a first moving blade and a cooling configuration. The cooling configuration has a first cooling-air feed at the first guide blade for cooling the first guide blade, a first cooling-air supply at a first pressure for supplying the first cooling-air feed, and a second cooling-air feed disposed downstream of the first cooling-air feed for cooling the first guide blade. The second cooling-air feed is supplied with a second pressure lower than the first pressure.

10 Claims, 2 Drawing Sheets

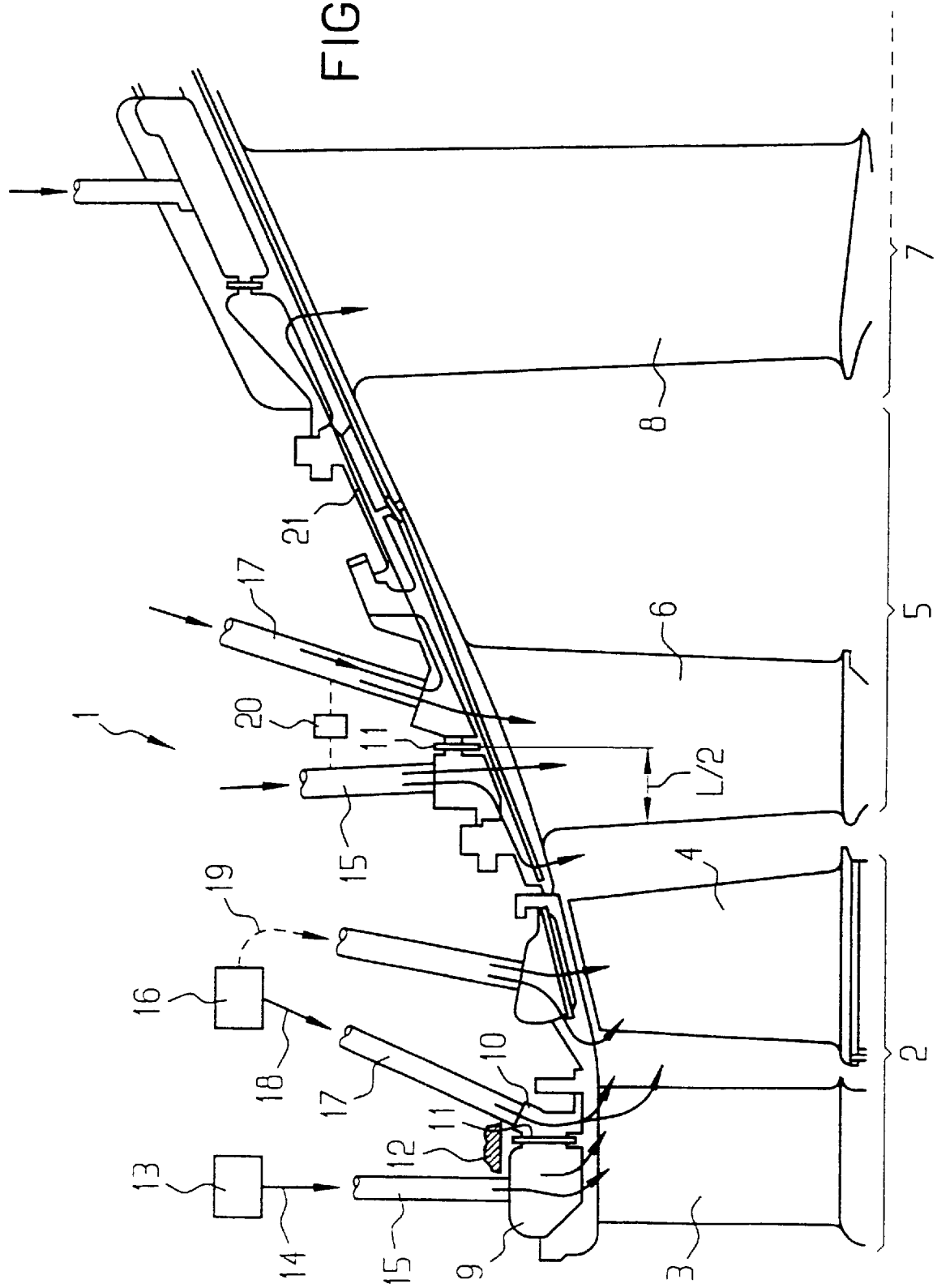

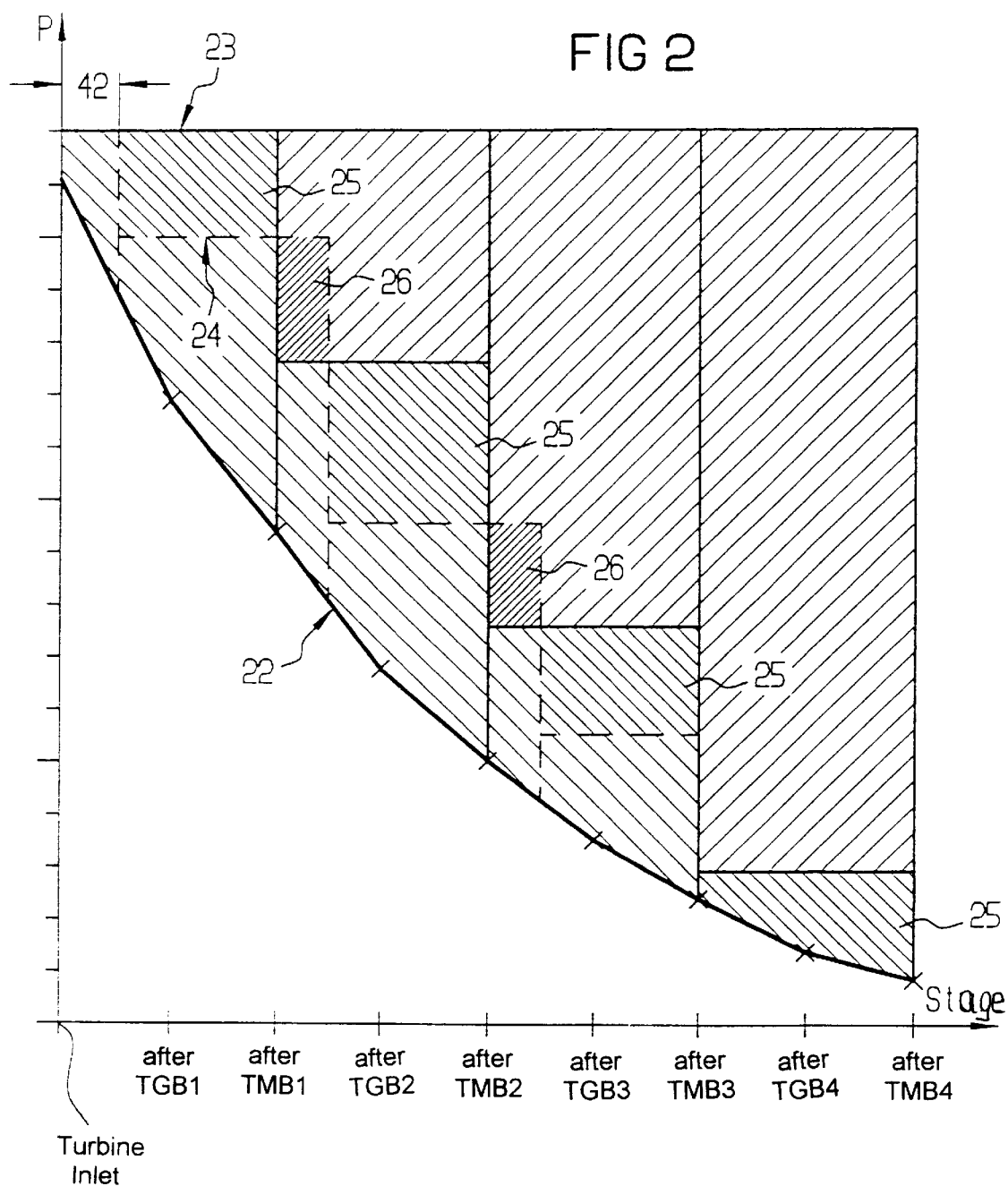

GAS TURBINE HAVING A TURBINE STAGE WITH COOLING-AIR DISTRIBUTION

CROSS-REFERENCE TO RELATED APPLICATION

This application is a continuation of copending International Application No. PCT/DE98/02030, filed Jul. 20, 1998, which designated the United States.

BACKGROUND OF THE INVENTION

Field of the Invention

The invention relates to a gas turbine including a first stage having a first guide blade, a first moving blade and a cooling configuration for cooling the first guide blade with air through a first cooling-air feed at the guide blade to be cooled, the cooling-air feed having a first cooling-air supply at a first pressure.

In order to achieve a high efficiency in a gas turbine, it is attempted, on one hand, to achieve gas inlet temperatures which are as high as possible and, on the other hand, to keep the quantity of cooling air required for cooling guide blades and moving blades of a stage as small as possible due to an efficiency loss caused thereby. Guide and moving blades are each disposed in a corresponding blade ring.

The turbine guide blades are supplied with cooling air in stages. The cooling air originates from various bleeds from a compressor of the gas turbine. That is described, for example, in a company brochure entitled "Die 3A-Gasturbinen-Familie von Siemens" [The 3A Gas Turbine Family of Siemens], Siemens Aktiengesellschaft, order No. A96001-U10-A281, February 1995. Therefore, in order to cool the stage and in particular the turbine guide blade, a certain pressure gradient is required and that pressure gradient determines the requisite pressure of the respective bleed.

SUMMARY OF THE INVENTION

It is accordingly an object of the invention to provide a gas is turbine having a turbine stage with cooling-air distribution, which overcomes the hereinafore-mentioned disadvantages of the heretofore-known devices of this general type and which limits a cooling-air quantity for a turbine stage and in particular for a guide-blade ring in order to achieve a high efficiency of the gas turbine.

With the foregoing and other objects in view there is provided, in accordance with the invention, a gas turbine, comprising a first turbine stage including a first guide blade; a first moving blade; and a cooling configuration having a first cooling-air feed at the first guide blade for cooling the first guide blade to be cooled with air, a first cooling-air supply at a first pressure for supplying the first cooling-air feed, and a second cooling-air feed disposed downstream of the first cooling-air feed for cooling the first guide blade, the second cooling-air feed supplied with a second pressure lower than the first pressure.

It follows from this construction of the cooling configuration that a stage now has different cooling-air regions. It is thereby possible for there to be an increased pressure gradient of the cooling air only where it is required in the stage, namely in particular in the region of the cooling-air inlet into the turbine guide blade. In the other regions, in which the cooling air is mainly used to is perform the function of sealing air, a high pressure gradient is now no longer produced. On the contrary, the second cooling-air feed at the lower second pressure permits adequate cooling with less leakage-air mass flow. This leads to an increase in the efficiency of the gas turbine as compared with a cooling-air supply in which the first turbine stage after the combustion chamber from the inlet of the No. 1 turbine guide blade up to a rear hooking of the guide ring is operated completely with final compressor air and the following second turbine stage from the inlet of the No. 2 turbine guide blade up to a front hooking of the No. 3 turbine guide blade is cooled with air from a No. 3 bleed of the compressor. This is because, in this case, at both stages, the cooling-air inlet in each case lies upstream of the guide blade, i.e. at the high pressure that is still not reduced over the stage.

In accordance with another feature of the invention, it is especially advantageous if the second cooling-air feed is disposed after one-third, in particular after one-half, of the axial length of the guide-blade ring, i.e. as viewed in the direction of the axis of rotation of the gas turbine. The upstream guide-blade regions, which are subjected to especially high thermal loading, are sufficiently cooled through the first cooling-air feed in accordance with the mass flow originating from the first cooling-air supply. Therefore, downstream regions are sufficiently cooled through the second cooling-air feed at lower pressure without impairment of function.

In accordance with a further feature of the invention, to this end, the second cooling-air feed has a second cooling-air supply, which is separate from the first cooling-air supply. For example, the first cooling-air supply and the second cooling-air supply may each be different bleed points of the gas-turbine compressor.

In accordance with an added feature of the invention, the second cooling-air feed is connected through a pressure reducer to the first cooling-air supply. The pressure reducer ensures that the cooling-air mass flow of the second cooling-air feed is as small as possible but well proportioned. It is therefore expedient for the pressure reducer to be made controllable.

In accordance with an additional feature of the invention, this also makes it possible in particular for the second pressure to just still have a value such that the air fed through the second cooling-air supply still acts as sealing air. Due to this extremely small pressure difference between the cooling air and the hot-gas pressure in the interior of the gas turbine, the cooling-air mass flow used and the efficiency loss associated therewith therefore likewise turn out to be small. In this case, values of 2 bar, in particular values of around 1 bar or even lower, can be set as a pressure difference.

In accordance with yet another feature of the invention, the second cooling-air feed of the first stage also serves as a first cooling-air feed for a second stage following the first stage downstream. In this case, this cooling-air feed is preferably used for the cooling of a guide-blade ring of the second stage. On one hand, this enables the number of requisite bleeds and thus the construction cost to be kept down. On the other hand, the requisite cooling-air mass flow can in turn be kept small by reducing the pressure difference.

In accordance with yet a further feature of the invention, which is especially favorable for a gas turbine having an annular combustion chamber, the guide blade has a first chamber for the first cooling-air supply and a second chamber for the second cooling-air supply, which are adjacent one another and adjoin a carrier for the guide blade. In accordance with a concomitant feature of the invention, the first chamber and the second chamber are separated from one another by a wall, the wall being inserted into the guide-blade carrier and the guide blade. To this end, slots are preferably turned in the guide-blade carrier and a bead is integrally cast on the guide blade during the casting of the latter. An axial barrier plate can preferably be inserted as the wall between the chambers and can also be fitted subsequently for then subdividing a single chamber into a first and a second chamber.

Other features which are considered as characteristic for the invention are set forth in the appended claims.

Although the invention is illustrated and described herein as embodied in a gas turbine having a turbine stage with cooling-air distribution, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a fragmentary, diagrammatic, simplified, longitudinal-sectional view of a gas-turbine cooling configuration according to the invention; and FIG. 2 is a diagram showing a comparison of a pressure profile representing a pressure gradient used heretofore in the prior art and a pressure gradient stepped according to the invention.

DESCRIPTION OF THE PREFERRED EMBODIMENTS

Referring now to the figures of the drawings in detail and first, particularly, to FIG. 1 thereof, there is seen a simplified representation of a portion of a gas turbine 1 in a longitudinal section. A first stage 2 having a first guide-blade ring 3 and a first moving-blade ring 4, a second stage 5 having a second guide-blade ring 6, and a third stage 7 having a third guide-blade ring 8, are shown. In the case of the second stage 5 and the third stage 7, the respective moving blades are not shown. A first chamber 9 and a second chamber 10 are located at the first guide blade 3. A wall 11 which is disposed between these two chambers 9, 10 is inserted into the guide blade 3 and a guide-blade carrier 12.

A first cooling-air supply 13 supplies the first chamber 9 with a first cooling-air mass flow 14, which is shown as an arrow. In this case, the first cooling-air mass flow 14 follows a path which is predetermined for it by a first cooling-air feed 15, right into the first stage 2. In this example, the first cooling-air feed 15 also has flow passages in the first guide blade 3 itself. The second chamber 10 is supplied with a second cooling-air mass flow 18 from a second cooling-air supply 16, through the use of a second cooling-air feed 17. The first cooling-air mass flow 14 has a higher pressure than the second cooling-air mass flow 18. On one hand, the first cooling-air supply 13 is operated with final compressor air. On the other hand, the second cooling-air supply 16 is operated with compressor air from a bleed of a non-illustrated compressor. In this way, the first guide blade 3 is acted upon and cooled by two different pressures. In this case, the pressures being used are set in such a way as to ensure that the respective cooling air functions as sealing air at all times. The moving blade 4 following the first guide blade 3 is likewise cooled. A third cooling-air mass flow 19 which is advantageously used for this purpose also originates from the second cooling-air supply 16.

The second stage 5 having the second guide blade 6 which is also shown in FIG. 1 is cooled as well. In this case, too, the guide blade 6 is acted upon in each case by different cooling-air mass flows, which is indicated by arrows. In this process, the cooling-air mass flows likewise pass through a chamber in each case. The two chambers are again separated from one another by a wall 11. The wall 11 is advantageously disposed in such a way that it is located approximately half way along an axial length of the guide blade 6, which is represented by reference symbol L/2. Furthermore, a pressure reducer 20 is disposed between the first cooling-air feed 15 and the second cooling-air feed 17 of the second guide blade 6. It is possible for a cooling-air mass flow to flow over from the first cooling-air feed 15 into the second cooling-air feed 17 through the pressure reducer 20. The cooling-air mass flow which flows through the second cooling-air feed 17 therefore not only supplies the second guide blade 6 but likewise serves to cool the following third guide blade 8 of the third stage 7. A corresponding fourth cooling-air mass flow 21 for cooling the third guide blade 8 is again indicated as an arrow. The cooling-air mass flow being used can therefore be reduced, as can the requisite pressure gradient, due to this subdivision of the cooling-air feed over the stage and in particular over the guide blades. This is explained in more detail below.

FIG. 2 shows a diagram of a pressure profile 22 in a gas turbine. Pressure is plotted on the Y-axis, and location of the respective pressure in the gas turbine is plotted on the X-axis. The zero point of the diagram coincides with a turbine inlet. This is then followed by a turbine guide blade, abbreviated TGB, then a turbine moving blade, abbreviated TMB, in each case identified by a digit characterizing a stage. A pressure level identified by reference numeral 23 represents the final compressor pressure, which at the same time represents that cooling-air mass flow which is used in the turbine inlet. The cooling concept which is used by way of comparison provides for the use of the final compressor pressure until after the moving blade 1 (TMB1). In accordance with the concept according to the invention, a cooling-air mass flow having a different, lower pressure is used after half the axial length L/2 of the guide blade TGB1. This corresponds to the pressure value in accordance with reference numeral 24.

Therefore, with respect to FIG. 1, the first cooling-air mass flow 14 having the final compressor pressure 23 is delivered as a first pressure and the second cooling-air mass flow 18 having the pressure value 24 is delivered as a second pressure. A square 25 marked by hatching from top left to bottom right in the diagram identifies the saving which results due to the (saved) pressure gradient that is modified relative to the prior art. A square 26 marked by hatching from bottom left to top right represents the additional pressure gradient which results due to the modified feed of cooling air. The gain in pressure gradient therefore results from the difference between the areas of the squares 25 marked by hatching from top left to bottom right and the areas of the squares 26 marked by hatching from bottom left to top right. In this case, the pressure remaining between the pressure profile 22 in the gas turbine 1 and the respective lower limits of the squares 25, 26 serves as sealing pressure. The sealing pressure is the excess pressure prevailing during the cooling-air feed relative to the pressure 22 prevailing in the gas turbine 1. The pressure gradient resulting for this is markedly smaller compared with the prior art. A corresponding result is obtained for the stages 5, 7 following the first stage 2, a fact which is indicated by further squares 25, 26. The area which is identified by hatching lines above the pressure profile 22 in the turbine designates that pressure gradient relative to the respective pressure profile 22 in the gas turbine 1 which is saved relative to the final compressor pressure 23. In addition, in accordance with the concept of now using two different pressures over the guide blade 3, the fact that the rear part of the guide blade 3 and the corresponding guide ring are cooled with colder air than the front part, which is cooled with air under higher pressure, turns out to be an advantage.

The present invention is able to considerably reduce the expenditure for cooling the stages of a gas turbine and thus helps to increase the turbine efficiency.

We claim:

1. A gas turbine, comprising a first turbine stage including:
   a first guide blade;
   a first moving blade; and
   a cooling configuration having a first cooling-air feed at said first guide blade for cooling said first guide blade, a first cooling-air supply at a first pressure for supplying said first cooling-air feed, and a second cooling-air feed disposed downstream of said first cooling-air feed for cooling said first guide blade, said second cooling-air feed supplied with a second pressure lower than said first pressure.

2. The gas turbine according to claim 1, wherein said first guide blade has a given axial length, and said second cooling-air feed is disposed at said first guide blade after one-third of said given axial length.

3. The gas turbine according to claim 1, wherein said first guide blade has a given axial length, and said second cooling-air feed is disposed at said first guide blade after one-half of said given axial length.

4. The gas turbine according to claim 1, including a second cooling-air supply for said second cooling-air feed.

5. The gas turbine according to claim 1, including a pressure reducer connected between said second cooling-air feed and said first cooling-air supply.

6. The gas turbine according to claim 4, wherein said second pressure has a value causing air fed through said second cooling-air supply to serve as sealing air.

7. The gas turbine according to claim 1, including a second stage disposed downstream of said first stage, said second cooling-air feed of said first stage being a first cooling-air feed for said second stage.

8. The gas turbine according to claim 7, wherein said second stage has a guide blade, and said first cooling-air feed for said second stage acts upon said guide blade of said second stage.

9. The gas turbine according to claim 4, wherein said first guide blade has a first chamber communicating with said first cooling-air supply and a second chamber communicating with said second cooling-air supply, said chambers are mutually adjacent, and a carrier for said first guide blade adjoins said chambers.

10. The gas turbine according to claim 9, including a wall inserted into said carrier and into said first guide blade, said first chamber and said second chamber separated from one another by said wall.

* * * * *